United States Patent [19]
Gnann et al.

[11] Patent Number: 5,780,802
[45] Date of Patent: Jul. 14, 1998

[54] PROCESS FOR MACHINING AND BUTT-WELDING AT LEAST ONE EDGE OF A SHEET METAL PLATE

[75] Inventors: Rüdiger A. Gnann, Ravensburg; Michael Strobel, Ostrach, both of Germany

[73] Assignee: Maschinenfabrik, Karl H. Arnold GmbH & Co. KG, Ravensburg, Germany

[21] Appl. No.: 558,075

[22] Filed: Nov. 10, 1995

[30] Foreign Application Priority Data

Nov. 11, 1994 [DE] Germany ............... 44 40 365.8

[51] Int. Cl.⁶ .................. B23K 15/00; B23K 26/00
[52] U.S. Cl. ................ 219/121.14; 219/121.64; 219/105; 219/137 R
[58] Field of Search ............... 219/105, 121.13, 219/121.14, 121.63, 121.64, 78.15, 137 R; 228/164, 171, 172; 409/138; 451/365

[56] References Cited

U.S. PATENT DOCUMENTS

| | | | |
|---|---|---|---|
| 2,010,922 | 8/1935 | Leonard | 451/239 |
| 2,659,278 | 11/1953 | Schultz | 409/138 |
| 3,129,447 | 4/1964 | Ralphs | 409/138 |
| 3,170,271 | 2/1965 | Unterbrink et al. | 451/365 |
| 3,762,273 | 10/1973 | Sprung | 409/138 |
| 3,909,580 | 9/1975 | Krakow | 219/105 |
| 3,922,951 | 12/1975 | Linsinger | 409/138 |
| 4,648,762 | 3/1987 | Hall et al. | 409/138 |
| 4,827,100 | 5/1989 | Frings et al. | 219/121.64 |

FOREIGN PATENT DOCUMENTS

| | | | |
|---|---|---|---|
| 279866B1 | 3/1992 | European Pat. Off. | |
| 2257255 | 5/1973 | Germany. | |
| 4110418 | 5/1992 | Germany. | |
| 54-9132 | 1/1979 | Japan | 219/121.64 |
| 1311654 | 3/1973 | United Kingdom. | |

*Primary Examiner*—Teresa J. Walberg
*Assistant Examiner*—Gregory L. Mills
*Attorney, Agent, or Firm*—Arthur Z. Bookstein; John F. Perullo

[57] ABSTRACT

The invention relates to a process of butt-welding together sheet metal plates, in particular those having different sheet metal thicknesses, by means of an edge preparation that mills the edges of the sheet metal plates while they are clamped in a sheet metal stack. For this purpose, an appropriate apparatus is provided having supporting and clamping mechanisms.

6 Claims, 2 Drawing Sheets

PROCESS FOR MACHINING AND BUTT-WELDING AT LEAST ONE EDGE OF A SHEET METAL PLATE

FIELD OF THE INVENTION

This invention relates to a process for butt-welding together sheet metal plates by beam welding to produce tailored blanks, that is, planar forms with different sheet thicknesses, and to an apparatus for machining at least one edge of a sheet metal plate in preparation for the butt-welding.

BACKGROUND OF THE INVENTION

In the future, particularly in the automobile industry, galvanized sheet metal with different sheet thicknesses will be butt-welded together in large quantities and tailored blanks, i.e. made-to-measure plates will be produced. The use of different sheet thicknesses, in the assembly of automobiles enhances safety, by improving crash worthiness while reducing vehicle weight, thereby improving performance. Today most automobile manufacturers use a unitary sheet metal thicknesses in the doors and reinforce the soft trimmed inner door, with tubes to provide better impact protection. The same safety can be achieved, however, if the inner door is produced from thick metal sheets in the lower region and from thin metal sheets in the window area. Another new method of construction is to produce a vehicle door from four parts by means of a beam welding process.

There are several advantages to producing tailored blanks, especially in the automobile industry. Vehicle weight is reduced. Transport costs are reduced because the steel producer can deliver preassembled plates to the automobile pressing works. The use of semifinished material (galvanized sheet metal) is reduced, because the welding together several parts, eliminates waste in the production of the window section of the door. Corrosion resistance of the galvanized sheet metal is maintained when it is welded with the laser beam because the zone in which the zinc on the upper surface burns is so narrow that remote effectiveness of the zinc coating still provides protection.

The welding together of galvanized metal sheets, in particular of different sheet thicknesses, is disclosed, for example, in EP 0 279 966 B1. According to this document, a formed body is produced from sheet metal parts of different thicknesses. Flat sheet metal parts of different thicknesses are butt-welded together into one unit with a laser beam in accordance with the later stress on the shaped body. The unit consisting of the butt-welded flat sheet metal parts is then reformed by drawing or pressing it into the formed body.

An apparatus is disclosed in GB-1-311 654 for machining sheet metal edges which are intended to be butt-welded together. This document discloses that several metal sheets can be collected together in a stack and the machining process can be carried out by milling.

The aim of the present invention is to achieve optimal process reliability when butt-welding together sheet metal plates having different sheet thicknesses where the welding is performed by means of beam technology (laser beam, electron beam or the like).

SUMMARY OF THE INVENTION

The present invention provides for the butt-welding together of sheet metal plates by beam welding to produce tailored blanks, i.e. planer forms with different sheet thicknesses, using the following process steps:

a) collecting several sheet metal plates together in a sheet metal stack b) aligning at least one edge side of the sheet metal stack c) clamping the aligned sheet metal stack with the interpositioning of wearing bars on both sides on the side of the stack to be machined d) machining the aligned edge side of the sheet metal stack e) abutting the machined edges of sheet metal plates machined according to d) and f) welding together the sheet metal plates at the abutted edges.

Through special machining and the resulting edge preparation for welding, a "zero gap" can be achieved upon abutment of the edges, which produces optimum process reliability in connection with the butt-welding. Attainment of process reliability is particularly significant when the sheet metal plates have different thicknesses. In this case, it is irrelevant whether the plane surface of two sheet metal plates of different thicknesses lies at the top or the bottom.

The type of edge preparation provided by this invention is relatively simple and can be effected in such a short time that the process can be placed in series production without creating delays. Achieving a "zero gap" at the butt-joint of the sheet metal plates increases the process speed. Additionally, this particular manufacturing method allows any desirable contours, even curved ones, to be used with great precision by using a suitable tool. Therefore, the production process for tailored blanks is considerably expanded and a uniform process operation can be attained.

The edge preparation of the kind mentioned above depends on the use of an apparatus for machining at least one edge of a sheet metal plate. This apparatus has a supporting and clamping means for a sheet metal stack as well as a machining tool for machining one edge side of the sheet metal stack so that several edges can be machined simultaneously in one operation step.

Machining of the sheet metal stack is preferably accomplished by means of milling. During machining the sheet metal stack can be additionally supported at the side which lies opposite the side being machined so that there is a resistance to the machining pressure without a displacement of the sheets or the sheet metal stack itself.

The previously mentioned wearing bars are arranged in this apparatus between clamping parts of the supporting and clamping means and the sheet metal stack. A small amount of material is removed from the wearing bars during the machining process. However, the support of the wearing bars prevents the sheet metal lying in the edge zone from bending during machining.

It is useful to provide at least two clamping regions on the apparatus. One clamping region is in the vicinity of the machining tool and is stationary or arranged to be advancable. The other clamping region is spaced a distance from the first of which is arranged at and is transversely displaceable or transversely displaceable and pivotable and advancable. In this manner, it is ensured that a clamping force is always provided in the vicinity of the machining location. The mobility of the clamp allows for adjustment to accommodate different sizes of the sheet metal plates. The clamps can be adjusted to suitable locations to safely prevent sliding of the aligned sheets thus ensuring an exact edge preparation for welding. In these cases, the clamping force is preferably directed only from above.

To align the sheet metal stack for the edge machining, a clamping part is arranged on the side of the sheet metal stack which lies opposite the machining tool. The clamping part is provided for abutment against the sheet metal stack to produce alignment. This clamping part is also capable of being pivoted and/or transversely displaced.

BRIEF DESCRIPTION OF THE DRAWINGS

The invention is described in more detail in the following with reference to exemplary embodiments schematically illustrated in the drawings, in which.

DESCRIPTION OF THE ILLUSTRATIVE EMBODIMENTS

Figure 1:
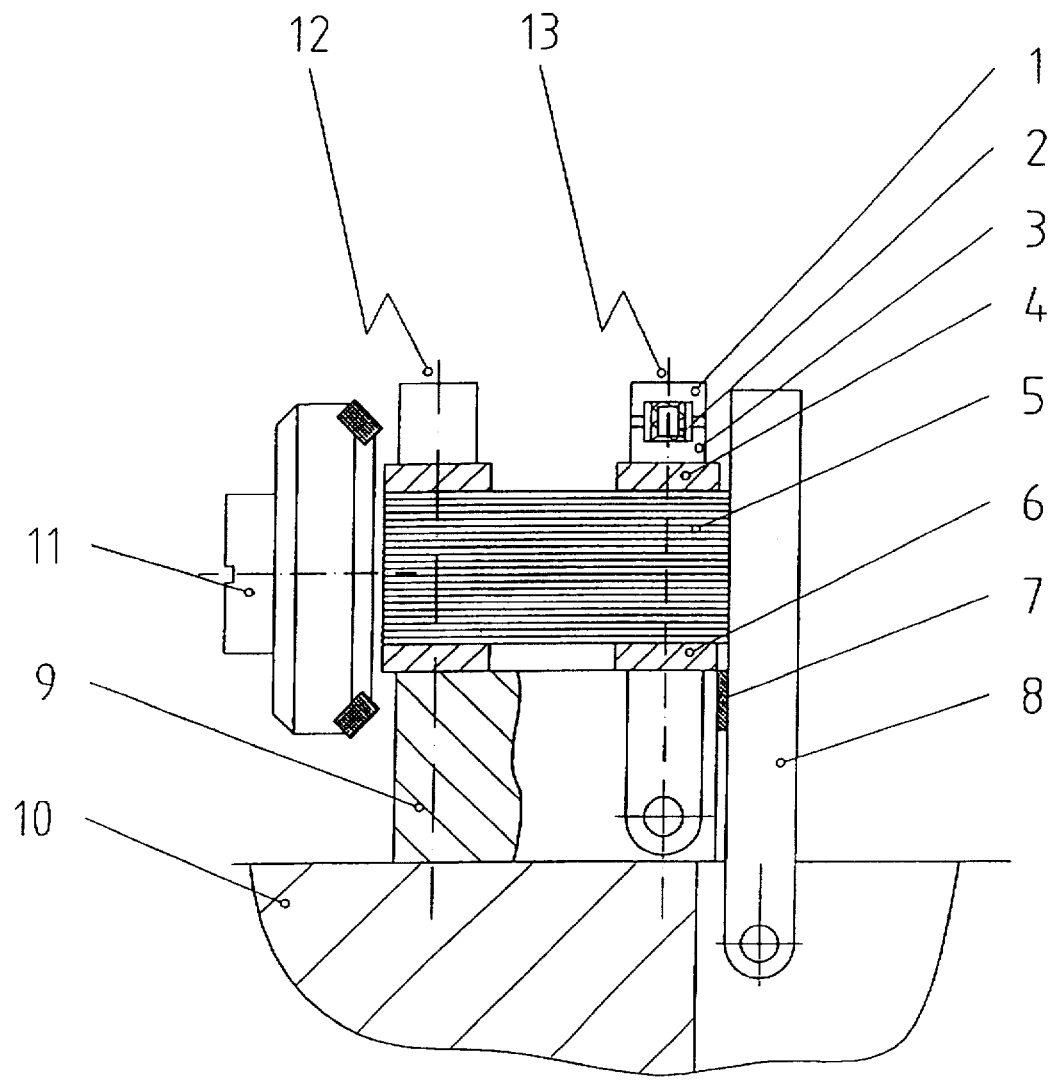
FIG. 1 shows a sectional view through an apparatus for edge preparation of sheet metal plates, to be butt-welded together, in a sheet metal stack with a milling tool arranged on one side.

The apparatus for edge preparation is show in FIG. 1. An assembly plate 9 is arranged above a base plate 10. Arranged above the assembly plate 9 is a sheet metal stack 5 consisting of a plurality of aligned, overlying sheet metal plates. Wearing bars 4 and 6 are provided on both sides of the sheet metal stack 5. Two clamping regions 12 and 13, are provided. Clamp region 12 is fixedly associated with the machining tool, but advancable. Claim region 13 is capable of being changed in position and advancable. There is a clamping bracket 1 and a clamping bar 3 between which a tubular cylinder is arranged. The clamping bracket 1 in the clamping area 13 is pivotable and also transversely displaceable for adaptability to different sheet metal plate sizes and to enable the clamping bracket to move in and out.

In FIG. 1, a cutting head of a milling tool 11 is shown at one side of the sheet metal stacks. The milling tool performs the machining necessary to prepare the edges of the sheet metal plates of the sheet metal stack for a process of butt-welding in such a manner that it is possible to produce the butt joint without a gap. This precise edge preparation is made possible by the machining of the edges in the stack, as schematically shown in the drawing.

Figure 2:
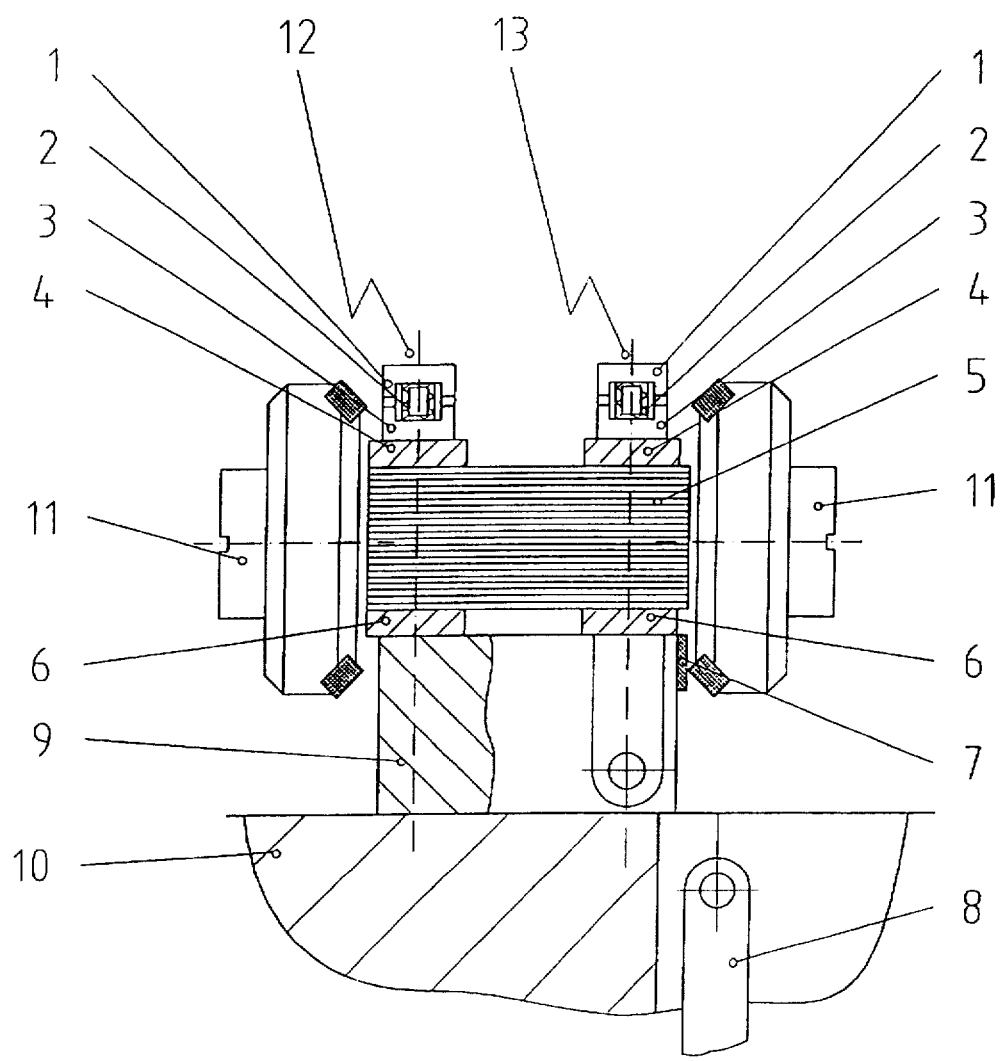
FIG. 2 shows a corresponding view of the apparatus of FIG. 1 having two milling tools.

At the side of the sheet metal stack 5 opposite the milling tool 11, there is a clamping guide bar 8 which abuts against a stop 7. The guide bar and stop provide a means by which the sheet metal stack 5 can be aligned for clamping in the correct position. The clamping guide bar 8 can be pivoted away if machining of the sheet metal stack 5 is also to be carried out on this side. However, the clamping guide bar 8 can also be stationary in the clamping region of the machining device. The clamping guide bar 8 is shown in FIG. 2 in the position in which it has been pivoted away after the alignment of the sheet metal stack 5. On this side of the sheet metal stack 5 there is a second milling tool 11 to perform machining.

DESCRIPTION OF OPERATION

The sheet metal plates are normally delivered in a stacked form in transport frames for processing. As a preparation for the welding seam connection, an edge machining of the sheet metal plates is carried out first. In this case, the edge machining of the sheet metal stack as a package takes place by means of milling. For this milling, the sheet metal stack is carefully vertically aligned in the transverse and longitudinal directions otherwise the edge regions of the metal sheets would be bent on account of the applied stress.

Located at a loading portal is crane gear which can engage beneath the stack. By means of parallel grips, the stack is vertically aligned in the longitudinal and transverse directions. The alignment is enhanced by impulses (for example, by an impact cylinder). The sheet metal stack is then placed in the apparatus for edge preparation according to the drawings and subsequently machined, after which the sheet metal stack is put back in the transport frame.

Following placement of the sheet metal stack in the apparatus, the clamping brackets 1 are moved over the sheet metal stack. In the loading area, clamping guide bars 8 which stand vertically are pressed from both sides against the sheet metal stack 5. Subsequently, wearing bars 4, 6 are moved against the clamping guide bars 8 at the support 9 and at the clamping brackets 1, 3. After positioning the stack, the clamping brackets 1 are subjected to a hydraulic force from above and the sheet metal stack is pressed on both sides. The clamping guide bars 8 move into their initial position (according to FIG. 2) and the milling slide with the milling tool 11 drives through a cutting head passage.

According to requirements, the milling units carry out a cyclical operating procedure with one or more milling passes. The setting of the milling path is adjusted in advance, as in the case of the milling cycles. The milled sheet metal stacks are subsequently supplied, after machining, to the welding unit where the machined edges are abutted against one another. Because of the optimal edge machining and edge preparation, there is no gap in the butt joint so that an optimal welding process can be carried out, even when a butt joint of sheet metal plates of different thicknesses is made. In the case of joining plates of different thicknesses, it is irrelevant whether the plane surface of two metal sheets of different thickness lies at the top or the bottom.

It should be understood that while the foregoing description of the invention is intended to be diagrammatic and illustrative only, other embodiments, modifications and uses may be apparent to those skilled in the art without departing from its spirit.

Having thus described the invention what we desire to claim and secure by letters patent is:

1. A process of butt-welding together sheet metal plates by means of beam welding to produce tailored blanks comprising:
    a) collecting a plurality of sheet metal plates into a sheet metal stack
    b) aligning at least one edge of each of the sheets along a side of the sheet metal stack to be machined
    c) clamping the aligned sheet metal stack between clamping and supporting means with wearing bars interposed between the stack and the clamping and supporting means on the side of the stack to be machined such that the wearing bars support the edge of the stack and are positioned to be machined by a machining tool during machining of the aligned-edge side of the sheet metal stack
    d) machining the aligned edge side of the sheet metal stack
    e) abutting the machined edges of sheet metal plates machined according to step d) and
    f) welding together the sheet metal plates at the abutted edges.

2. A process according to claim 1, wherein the machining of the sheet metal edges takes place by means of milling.

3. A process according to claim 1 or 2 wherein the sheet metal stack is machined simultaneously at two opposite sides.

4. A process according to claims 1 or 2 wherein the welding together takes place by means of a laser beam or an electron beam.

5. A process according to claim 1 or 2 wherein the sheet metal plates are galvanized.

6. A process of butt-welding together sheet metal plates by means of beam welding to produce tailored blanks comprising:

a) providing an apparatus for machining at least one edge of a sheet metal plate in preparation for butt-welding, comprising: a supporting and clamping means for a sheet metal stack, a machining tool for machining an edge side of the sheet metal stack and wearing bars arranged between the stack and the supporting and clamping means at the side of the sheet metal stack to be machined such that the wearing bars support the edge of the stack that will be machined b) collecting a plurality of sheet metal plates into a sheet metal stack c) placing the stack on the apparatus d) aligning at least one edge of each of the sheets along a side of the sheet metal stack e) clamping the aligned sheet metal stack between clamping and supporting means with the wearing bars interposed between the stack and the clamping and supporting means on the side of the stack to be machined, such that the wearing bars support the edge of the stack and are positioned to be machined by the machining tool during machining of the aligned-edge side of the sheet metal stack f) machining the aligned edge side of the sheet metal stack with the machining tool g) abutting the machined edges of sheet metal plates machined according to step f and h) welding together the sheet metal plates at the abutted edges.

* * * * *